M. & L. S. LACHMAN.
METHOD OF MAKING METALLIC FABRIC.
APPLICATION FILED MAR. 11, 1909.

974,891.

Patented Nov. 8, 1910.

WITNESSES.
J. R. Keller
Robert C. Totten

INVENTORS
Maurice Lachman
Lawrence S. Lachman
By Kay & Totten
attorneys

UNITED STATES PATENT OFFICE.

MAURICE LACHMAN AND LAURENCE S. LACHMAN, OF NEW YORK, N. Y., ASSIGNORS TO UNIVERSAL ELECTRIC WELDING CO., A CORPORATION OF NEW YORK.

METHOD OF MAKING METALLIC FABRIC.

974,891.      Specification of Letters Patent.      Patented Nov. 8, 1910.

Application filed March 11, 1909. Serial No. 482,822.

*To all whom it may concern:*

Be it known that we, MAURICE LACHMAN and LAURENCE S. LACHMAN, residents of New York, in the county of New York and State of New York, have invented a new and useful Improvement in Methods of Making Metallic Fabric; and we do hereby declare the following to be a full, clear, and exact description thereof.

Our invention relates to a method of making a metal fabric or structure suitable for uses to which it may be found applicable.

One of the objects of our invention is to provide a method of uniting the members of the fabric in such manner as to form a rigid integral fabric or structure which may be made in length and size to suit varying conditions. Other objects will appear from the hereinafter description.

With these ends in view our invention comprises, generally stated, the method of making metal fabric consisting in forming on one member of the fabric a suitable projection, placing another member in contact with said projection and passing electric current through the said members whereby sufficient resistance is created at the point of contact between said members to raise the temperature of the metal to a welding heat and then applying sufficient pressure to complete the weld. It is to be understood that the pressure is applied while the metal is in a welding condition. The time for this depends somewhat on the size of the members and welding projections. In practice, the pressure is applied during the time the metal is at the welding temperature and may be applied a short time after the current is cut off. It should be applied before the temperature has fallen below the welding point.

We have shown our invention as applied to members consisting of round rods and flat strips with suitable projections on the flat strips, but it is to be understood that we do not confine ourselves to such specific form of members. The invention in its broadest sense is considered to apply to the production of a fabric or structure whose members are or may be of any form in cross section to which the fabric or structure is applicable, and at least, one having said ridges or projections thereon.

Figure 1:
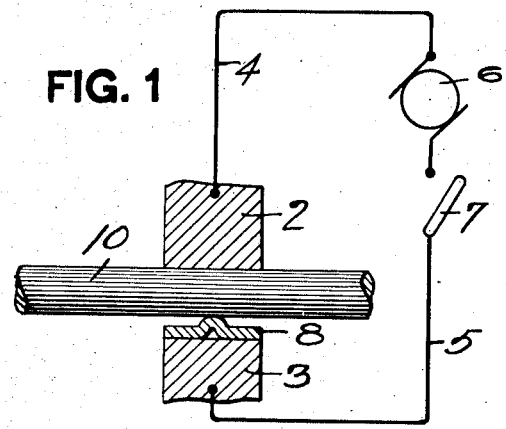
Figure 2:
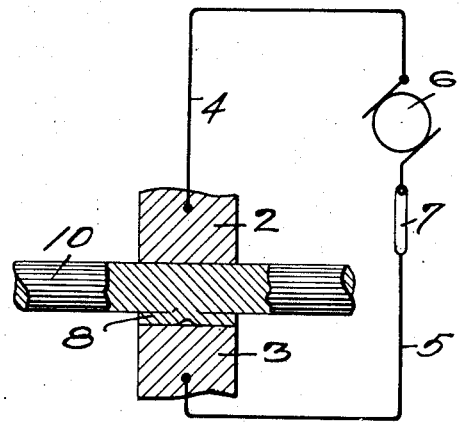
Figure 3:
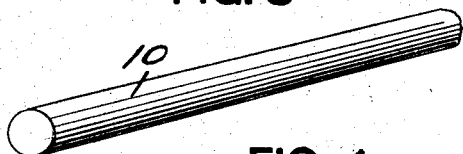
Figure 4:
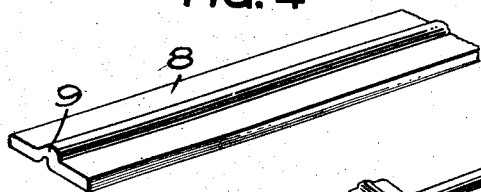
Figure 5:
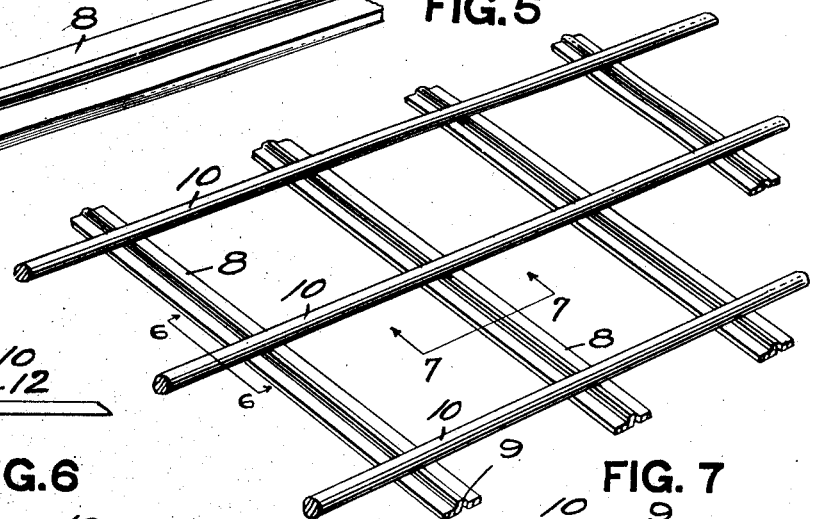
Figure 6:
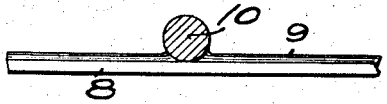
Figure 8:
Figure 7:

In the accompanying drawing: Figure 1 is a plan view partly in section of a suitable apparatus for carrying out said method. Fig. 2 is a like view showing the position of the apparatus after the weld is completed. Fig. 3 is a perspective view of one member, in this case a rod. Fig. 4 is a perspective view of another member, in this case a flat strip with a ridge thereon. Fig. 5 is a perspective view of a portion of the fabric made according to our method. Fig. 6 is a sectional view on line 6—6 of Fig. 5. Fig. 7 is a sectional view on line 7—7 of Fig. 5. Fig. 8 is a modified form of the invention.

We do not deem it necessary to illustrate in detail the form of electric welding apparatus for carrying out our invention, nor to illustrate the different forms of the members forming the fabric. The welding apparatus may be of any suitable character and the parts of the same have accordingly been indicated only diagrammatically.

The reference numeral 2 designates an upper die and 3 a lower die of the welding apparatus. An electric current is conducted to said dies by means of the wires 4 and 5 connected to the generator 6, a suitable switch 7 being provided in the circuit. On the lower die is placed one member of the fabric, in this case a metal strip 8, which may be of any dimension and gage suitable to the production of the particular fabric to be made. While we have shown said member as comparatively thin, it may be of any suitable thickness, width or cross section desired. Upon this member a ridge or projection 9 may be formed longitudinally thereof, in any desired manner. The other member of the fabric, in this case a round rod 10, is placed upon the member 8, the number of said rods varying according to the width, length and mesh of the fabric or structure to be formed.

When the member or members 10 have been properly arranged on the member or members 8, the upper die 2 is lowered and the switch 7 is operated to direct the current through the said members. Owing to the projection or ridge 9 being in contact with the face of the rod, sufficient resistance is created to the current to raise the temperature of the metal at the point of contact to a welding heat, and at the proper time the upper die is lowered to cause sufficient pressure to be exerted to force the plastic metal together and complete the weld. When the ridge or projection 9 is placed intermediate the outer edges of the member 8, sufficient metal is provided on opposite sides of the projection to prevent the burning or melting away of the metal, as the only portion of the metal brought to a welding temperature is that forming the projection, and the surrounding metal will not be affected.

Figure 9:

It is apparent that instead of forming the projection or ridge 9 longitudinally of the strip, teats or projections 12 may be formed at intervals as indicated in Figs. 8 and 9. While we have shown the projection intermediate of the said member, it is to be understood that it may be formed on such part and at such place on the said member as may be suitable for the particular fabric being constructed. In fact, it is to be understood that the invention is not limited to the kind or position of the projections here shown and described.

By the herein described method we are able to produce a metal fabric or structure of members so united as to be substantially integral, and by connecting the members together as described, the fabric or structure may be produced rapidly and at low cost. The fabric or structure so produced may be used for the many purposes to which it is or may be adapted.

What we claim as new and desire to secure by Letters Patent, is:

1. The method of producing a metallic fabric or structure formed of intersecting members, consisting in forming a projection on a strip, placing a metal rod in contact with said projection, passing a current through said rod and strip, the resistance to the passage of the current heating the metal at the point of contact to a welding heat, and applying pressure to complete the weld.

2. The method of producing a metallic fabric formed of intersecting members, consisting in forming a projection on a strip, placing a member in contact with said projection, passing a current through said strip and member to raise the temperature of the metal at the point of contact to a welding heat, and applying pressure.

3. The method of forming a metallic fabric, consisting in forming a projection on a flat strip, placing a round metal rod in contact with said projection and crossing the same at an angle, passing a current through said rod and strip, the resistance to the passage of the current heating the metal at the point of contact to a welding heat, and applying pressure to complete the weld.

4. The method of producing a metallic fabric formed of intersecting members, consisting in forming a projection on a strip intermediate its edges, placing a metal rod in contact with said projection, passing a current through said rod and strip to raise the temperature of the metal at the point of contact to a welding heat, and applying pressure.

5. The method of forming metallic fabric consisting in forming a projection on a flat strip intermediate its edges, placing a round metal rod in contact with said projection and crossing the same at an angle, passing a current through said rod and strip, the resistance to the passage of the current heating the metal at the point of contact to a welding heat, and applying pressure to complete the weld.

6. The method of forming metallic fabric consisting in forming a longitudinal ridge on a flat strip intermediate its edges, placing a round metal rod in contact with said projection and crossing the same at an angle, passing a current through said rod and strip, the resistance to the passage of the current heating the metal at the point of contact to a welding heat, and applying pressure to complete the weld.

7. The method of forming a metallic fabric composed of flat and round members crossing each other, consisting in forming a projection on one of said members, placing said members in contact, with the projection on one bearing against the face of the other, passing a current through said members at the point of intersection, the resistance to the passage of the current heating the metal at the point of contact to a welding heat, and applying pressure to complete the weld.

8. The method of forming a metallic fabric or structure composed of flat and round members crossing each other, consisting in placing said members in contact, passing a current through said members at the point of intersection, the resistance to the passage of the current heating the metal at the point of contact to a welding heat, and applying pressure to complete the weld.

9. The method of producing a metallic fabric or structure formed of intersecting members, consisting in forming a projection on one member, placing another member in contact with said projection, passing an electric current through said members at the point of contact to raise the temperature of the metal to a welding heat and applying pressure.

10. The method of producing a metallic fabric or structure formed of intersecting members, consisting in forming projections on one member, placing another member in contact with said projections, passing an electric current through said member to raise the temperature of the metal at the point of contact to a welding heat and applying pressure.

11. The method of producing a metallic fabric or structure formed of intersecting members, consisting in forming projections on some of the members, placing other members in contact with said projections, passing a current through said members to raise the temperature of the metal at the point of contact to a welding heat and applying pressure.

In testimony whereof, we the said MAURICE LACHMAN and LAURENCE S. LACHMAN have hereunto set our hands.

MAURICE LACHMAN.
LAURENCE S. LACHMAN.

Witnesses:
REGINALD HAWLEY,
J. W. CORRIGAN.